(12) United States Patent
Yao et al.

(10) Patent No.: US 10,267,391 B2
(45) Date of Patent: Apr. 23, 2019

(54) CONTINUOUSLY VARIABLE TRANSMISSION WITH WEDGE ACTUATION MECHANISM

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Chunhao J. Lee, Troy, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 15/183,948

(22) Filed: Jun. 16, 2016

(65) Prior Publication Data

US 2017/0363184 A1  Dec. 21, 2017

(51) Int. Cl.
*F16H 9/18* (2006.01)
*F16H 61/662* (2006.01)
*F16H 9/26* (2006.01)

(52) U.S. Cl.
CPC ............ *F16H 9/18* (2013.01); *F16H 9/26* (2013.01); *F16H 61/662* (2013.01)

(58) Field of Classification Search
CPC .......... F16H 9/18; F16H 7/1218; F16H 55/56; F16H 61/662; F15B 15/125
See application file for complete search history.

(56) References Cited

U.S. PATENT DOCUMENTS

| | | | |
|---|---|---|---|
| 5,540,048 A | 7/1996 | Larkin et al. | |
| 6,387,000 B1 * | 5/2002 | Eisenbacher | F04C 14/26 474/18 |
| 7,207,920 B2 | 4/2007 | Jonsson et al. | |
| 7,686,715 B2 | 3/2010 | Carlson et al. | |
| 8,858,389 B2 | 10/2014 | Lundberg et al. | |
| 9,261,187 B1 | 2/2016 | Otanez | |
| 2010/0113201 A1 * | 5/2010 | Lannutti | F16H 7/1218 474/135 |
| 2013/0116073 A1 * | 5/2013 | Liebel | F16H 7/1218 474/135 |
| 2016/0131230 A1 * | 5/2016 | Kawakami | F16H 9/18 474/28 |
| 2016/0281847 A1 * | 9/2016 | Kanayama | F16H 63/065 |

FOREIGN PATENT DOCUMENTS

EP  1048879 B1  6/2004

* cited by examiner

*Primary Examiner* — William E Dondero
*Assistant Examiner* — Robert T Reese
(74) *Attorney, Agent, or Firm* — Quinn IP Law (57) ABSTRACT

A continuously variable transmission (CVT comprises a shaft rotatable about an axis, and variator assembly, and an actuator mechanism. The variator assembly includes a pulley supported on the shaft and having a ramp surface, and an endless rotatable device frictionally engaged with the pulley. The ramp surface inclines in an axial direction along the axis toward the endless rotatable device. The CVT further comprises an actuator mechanism that includes a wedge component that has a wedge surface interfacing with the ramp surface, and a rotary piston operatively connected to the wedge component. The rotary piston defines a first fluid chamber pressurizable to apply a rotational force that provides relative motion between the ramp surface and the wedge surface resulting in a wedge force on the ramp surface and a clamping force of the endless rotatable device on the pulley.

20 Claims, 7 Drawing Sheets

CONTINUOUSLY VARIABLE TRANSMISSION WITH WEDGE ACTUATION MECHANISM

TECHNICAL FIELD

The present teachings generally include a continuously variable transmission.

BACKGROUND

Continuously variable transmissions vary a groove width of an input pulley and a groove width of an output pulley to vary the speed ratio of an input shaft to an output shaft. The groove width is typically varied by a hydraulic actuator that moves an axially-movable sheave of the pulley. Hydraulic actuation entails large pumping losses to maintain a required actuation force on the pulley. The pumping losses reduce the efficiency of the transmission.

SUMMARY

A continuously variable transmission (CVT) is disclosed that has an actuation mechanism utilizing the mechanical advantage of a wedge and is configured in a manner to operate with minimal hydraulic pumping losses. The CVT comprises a shaft rotatable about an axis, and variator assembly, and an actuator mechanism. The variator assembly includes a pulley supported on the shaft and having a ramp surface, and an endless rotatable device frictionally engaged with the pulley. The ramp surface inclines in an axial direction along the axis toward the endless rotatable device. The CVT further comprises an actuator mechanism that includes a wedge component that has a wedge surface interfacing with the ramp surface, and a rotary piston operatively connected to the wedge component. The rotary piston defines a first fluid chamber pressurizable to apply a rotational force resulting in a wedge force on the ramp surface and a clamping force of the endless rotatable device on the pulley.

In an embodiment, the pulley has two ramp surfaces. The wedge component has two wedge surfaces interfacing with the two ramp surfaces and arranged in a double helix. In some embodiments, the wedge component is fixed to the shaft. In other embodiments, the wedge component can rotate relative to the shaft, and an additional wedge component fixed to the shaft interfaces with another ramp surface of the shaft.

The wedge component and rotary actuator use the mechanical advantage of a wedge to increase clamping force of the endless rotatable device. Moreover, pumping losses can be minimal, as the wedge component, pulley, and endless rotatable device can be configured so that the fluid pressure in the first fluid chamber can be set to zero while still maintaining the desired axial position of the pulley.

The above features and advantages and other features and advantages of the present teachings are readily apparent from the following detailed description of the best modes for carrying out the present teachings when taken in connection with the accompanying drawings.

DETAILED DESCRIPTION

Figure 1:
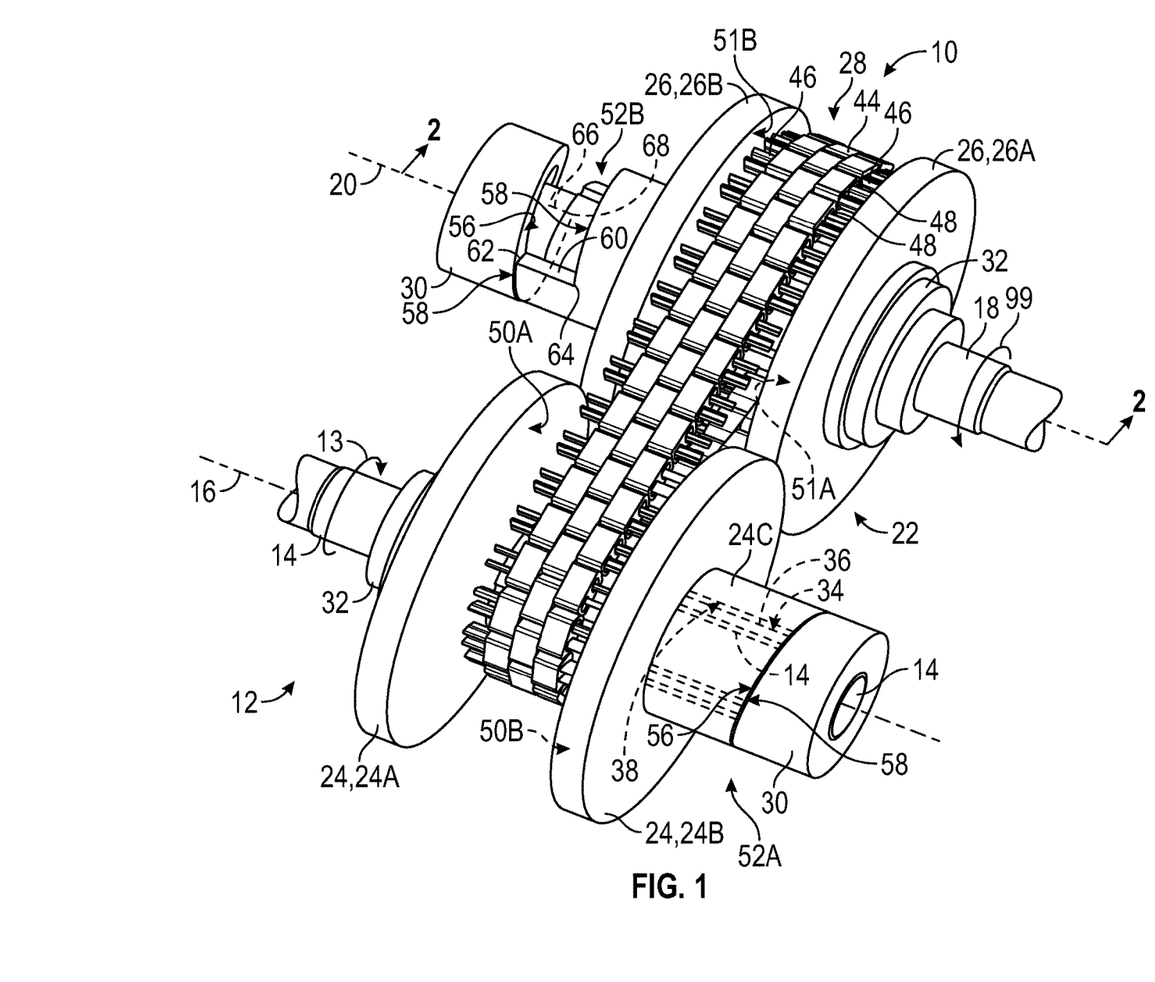
FIG. 1 is a schematic perspective illustration in partial fragmentary view of a first embodiment of a continuously variable transmission (CVT) with wedge actuators.

Referring to the drawings, wherein like components are referred to with like reference numbers, FIG. 1 shows a continuously variable transmission (CVT) 10 for a powertrain 12 of a mobile platform, such as a vehicle powertrain. The mobile platform, including by way of non-limiting examples, may be a passenger vehicle, a light-duty or heavy-duty truck, a utility vehicle, an agricultural vehicle, an industrial/warehouse vehicle, a recreational off-road vehicle, a robotic device, or an aeronautic device. The CVT 10 includes an input shaft 14 rotatable about an input axis 16, and an output shaft 18 rotatable about an output axis 20. The output axis 20 is also referred to herein as a first axis of rotation, and the input axis 16 is referred to herein as a second axis of rotation. The input axis 16 and the output axis 20 are generally parallel with one another. The powertrain 12 includes a power source (not shown) such as an engine that is operatively connected to drive the input shaft 14. The power source provides a driving torque 13 on the input shaft 14. The powertrain 12 may also include a load (also referred to as a torque load 99), such as vehicle wheels (not shown) driven by the output shaft 18. The input shaft 14 may be referred to as a drive shaft and the output shaft 18 may be referred to as a driven shaft.

The CVT 10 includes a variator assembly 22 that enables a controlled, continuously variable speed ratio between the input shaft 14 and the output shaft 18, and serves to transfer torque from the input shaft 14 to the output shaft 18. The variator assembly 22 includes an input pulley 24, an output pulley 26, and an endless rotatable device 28. The input pulley 24 is rotatably supported by the input shaft 14. Stated differently, the input pulley 24 is supported on the input shaft 14 and can rotate about the input axis 16. The input pulley 24 generally rotates about the input axis 16 with the input shaft 14, but is not fixed for common rotation with the input shaft 14 and can be controlled to have some rotation relative to the input shaft 14 as described herein.

As best shown in FIG. 1, the input pulley 24 includes an axially-fixed sheave 24A and an axially-movable sheave 24B. The axially-fixed sheave 24A is positioned between an axially-fixed wedge component 30, described herein, and an axially-fixed thrust bearing 32, also described herein, and thus is substantially constrained from axial movement relative to the input shaft 14 (i.e., in a direction along the input axis). The axially-movable sheave 24B is splined to an outer surface 34 of a shaft 36 of the axially-fixed sheave at an inner surface 38 of the axially-movable sheave 24B, as best shown with respect to the similar components of the output pulley 26 shown and described with respect to FIG. 2. The shaft 36 of the axially-fixed sheave 24A radially surrounds the input shaft 14, extending through the endless rotatable device 28 and through an inner diameter of a shaft 24C of the axially-movable sheave 24B. Both the axially-movable sheave 24B and the axially-fixed sheave 24A can be controlled to rotate in unison (i.e., together at the same speed) slightly relative to the input shaft 14 while the axially-movable sheave 24B moves axially along the input axis 16 to control a speed ratio of the input shaft 14 to the output shaft 18 and to control a clamping force of the endless rotatable device 28 on the input pulley 24, using the mechanical advantage of a wedge as described herein.

Figure 2:
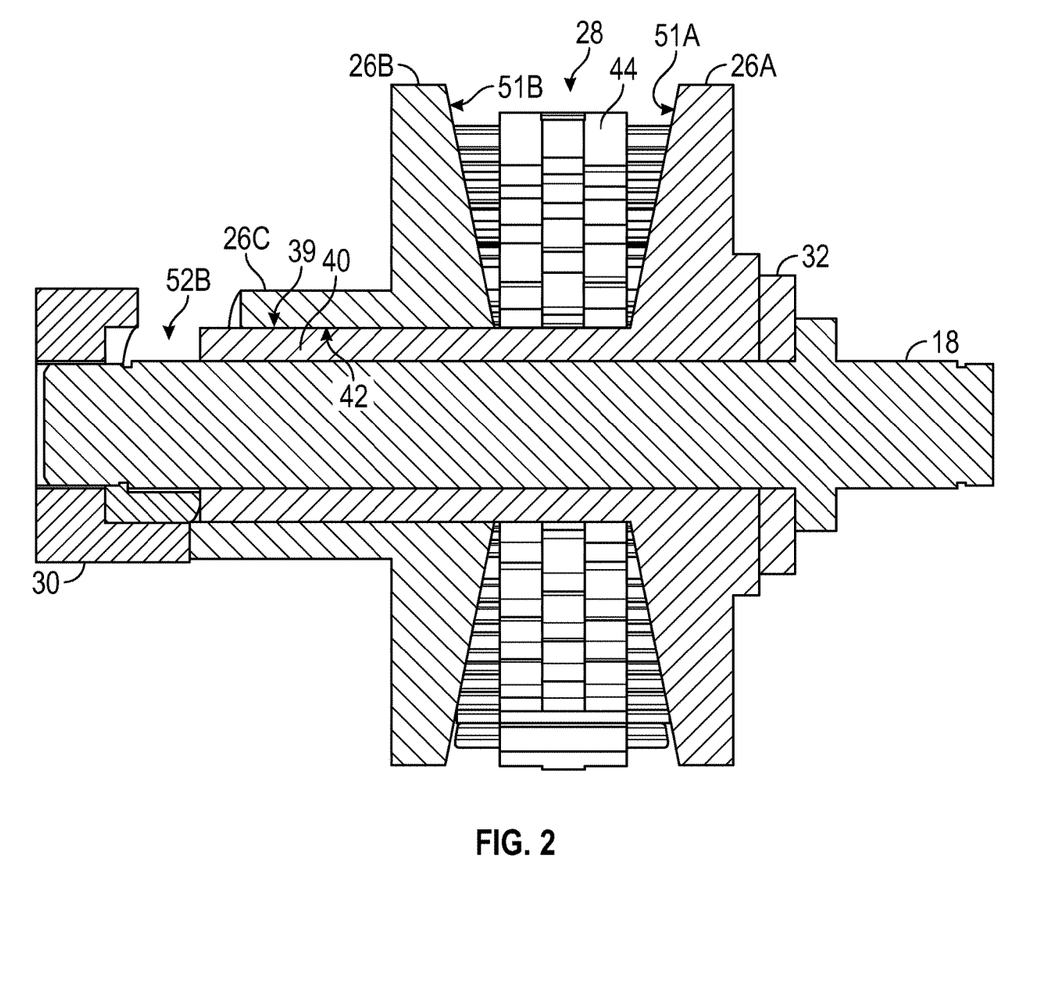
FIG. 2 is a schematic cross-sectional illustration of the CVT of FIG. 1 taken at lines 2-2 in FIG. 1

The output pulley 26 is rotatably supported by the output shaft 18. Stated differently, the output pulley 26 is supported on the output shaft 18 and can rotate about the output axis 20. The output pulley 26 generally rotates about the output axis 20 with the output shaft 18, but is not fixed for common rotation with the output shaft 18 and can be controlled to have some rotation relative to the output shaft 18 as described herein. As best shown in FIG. 2, the output pulley 26 includes an axially-fixed sheave 26A and an axially-movable sheave 26B. The axially-fixed sheave 26A is positioned between an axially-fixed wedge component 30, described herein, and an axially-fixed thrust bearing 32, also described herein, and thus is substantially constrained from axial movement relative to the output shaft 18 (i.e., in a direction along the output axis 20). The axially-fixed wedge component 30 and the axially-fixed thrust bearing 32 are identical to those disposed on the input shaft 14. Similar to the axially-movable sheave 24B of the input pulley 24, the axially-movable sheave 26B is splined to an outer surface 39 of a shaft 40 of the axially-fixed sheave 26A at an inner surface 42 of the axially-movable sheave 26B. The axially-movable sheave 26B includes a pulley shaft 26C that is splined to and extends along the shaft 40 of the axially-fixed sheave 26A. Both the axially-movable sheave 26B and the axially-fixed sheave 26A can be controlled to rotate in unison (i.e., together at the same speed) slightly relative to the output shaft 18.

The endless rotatable device 28 is frictionally engaged with the input pulley 24 and with the output pulley 26. As shown, the endless rotatable device 28 includes a chain 44 that carries pins 46 in openings 48 extending through links of the chain 44. The pins 46 frictionally engage with facing frustoconical surfaces 50A, 50B, 51A, 51B of the sheaves 24A, 24B, 26A, 26B of the respective pulleys 24, 26. The frusticonical surfaces 50A, 50B define a groove of the input pulley 24, and the frusticonical surfaces 51A, 51B define a groove of the output pulley 26. Alternatively, the endless rotatable device 28 could be a belt having overlapping steel bands held by blocks having angled surfaces that interface with the pulleys 24, 26. A person of ordinary skill in the art will readily understand the construction of various suitable chains and pulleys configured for use as endless rotatable devices in a CVT.

Figure 3:
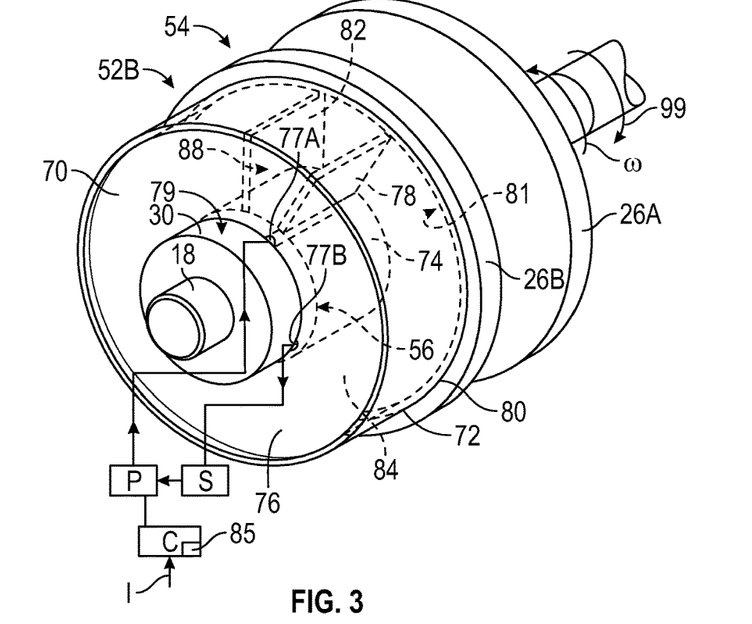
FIG. 3 is a schematic perspective illustration in partial fragmentary view of a portion of the CVT of FIG. 1 showing a rotary piston.
Figure 4:
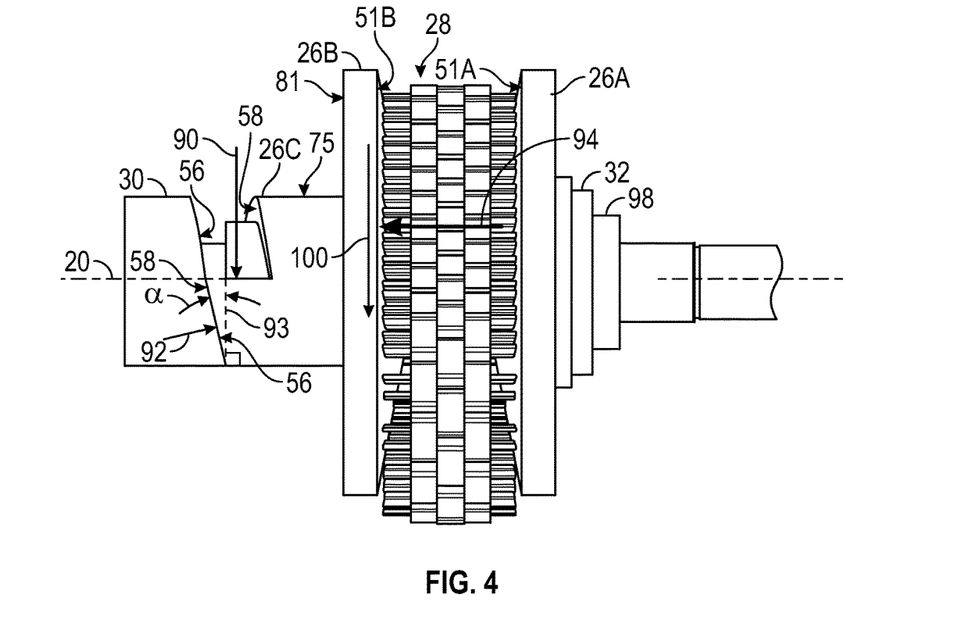
FIG. 4 is a schematic side view illustration in fragmentary view of the CVT of FIG. 1.

The CVT 10 includes an input actuator mechanism 52A operatively connected to the input pulley 24, and an identical output actuator mechanism 52B operatively connected to the output pulley 26. Each of the input actuator mechanism 52A and the output actuator mechanism 52B includes a wedge component 30 and a rotary piston 54. Only the wedge component 30 portion of each of the actuator mechanisms 52A, 52B is shown in FIG. 1, and the rotary pistons 54 are not shown in FIG. 1. The wedge component 30 of the output actuator mechanism 52B is also shown in FIGS. 2-4. The rotary piston 54 is shown in FIG. 3. The output actuator mechanism 52B is controllable to cause slight rotation of the output pulley 26 relative to the output shaft 18 and utilize the mechanical advantage of a wedge to increase clamping force of the endless rotatable device 28 on the pulley 26, adjusting the groove width to change the speed ratio while eliminating slippage. The input actuator mechanism 52A is configured and functions in an identical manner with respect to the input pulley 24 as the output actuator mechanism 52B is configured and functions with respect to the output pulley 26.

The output actuator mechanism 52B includes a wedge component 30 that has a wedge surface 56 interfacing with a ramp surface 58 of the pulley shaft 26C of the output pulley 26. The wedge surface 56 and the ramp surface 58 both incline in an axial direction along the output axis 20 toward the endless rotatable device 28. In the embodiment shown, the surfaces 56, 58 incline along a cylindrical outer diameter of the wedge component 30 and of the output shaft pulley 26C, respectively (i.e., toward the right in FIG. 4). More specifically, surface 56 extends in a helix one turn completely around the perimeter of the wedge component 30, and surface 58 extends in a helix one turn around the perimeter of the pulley shaft 26C. The wedge component 30 and the output pulley shaft 26C each have a step in the axial direction between the beginning and the end of each helical surface 56, 58. FIG. 1 shows a step 60 between the beginning 62 and the end 64 of the ramp surface 58. The beginning 66 and the end 68 of the helical wedge surface 56 of the wedge component 30 are blocked from view and are represented in hidden lines in FIG. 1.

As best shown in FIG. 3, the rotary piston 54 of the output actuator mechanism 52B is operatively connected to the wedge component 30. In the embodiment of FIGS. 1-4, the rotary piston 54 includes a stationary component 70 splined to the wedge component 30 and a rotary component 72 fixed to the axially-movable sheave 26B. The stationary component 70 includes a hollow cylindrical portion 74 that mounts to the outer surface 75 of the pulley shaft 40 and partway over the outer surface 79 of the wedge component 30. The stationary component 70 also includes a radial flange 76 extending radially-outward from the cylindrical portion 74. A vane 78 extends radially outward from the cylindrical portion 74 and is fixed to the cylindrical portion 74. The stationary component 70 is referred to stationary because it is splined to the output shaft 18 to rotate in unison with the shaft and cannot rotate relative to the output shaft 18.

The rotary component 72 includes a cylindrical cover 80 fixed at one end to the axially-movable sheave 26B. A vane 82 extends radially inward from an inner surface of the cylindrical cover 80. The stationary component 70 and the rotary component 72 enclose a cylindrical volume between the cover 80 and the cylindrical portion 74 and between the flange 76 and the outer side surface 81 of the axially-movable sheave 26B. The vanes 78, 82 are sized to extend radially from the cylindrical portion 74 to the cylindrical cover 80 in the cylindrical volume. The vane 82 can rotate toward or away from the stationary vane 78 as the rotary component 72 rotates with the pulley 26 relative to the shaft 18. Because the wedge component 30 causes the rotary component 72 of the rotary piston 54 to move axially with the axially-movable sheave 26B as the rotary component 72 rotates, the rotary component 72 slides axially with the housing 80, and the housing 80 also pull the axially-moveable radial flange 76 of the stationary component 70 to move axially while rotated slightly relative to the housing 80.

As best shown in FIG. 3, a first fluid chamber 84 is defined by the rotary piston 54. The first fluid chamber 84 is defined from the stationary vane 78 clockwise to the rotatable vane 82 in FIG. 3. The first fluid chamber 84 is a portion of the cylindrical volume (i.e., that portion from the fixed vane to the rotatable vane in the clockwise direction. The first fluid chamber 84 is pressurizable with a fluid to apply a rotational force on the movable vane 82. More specifically, the radial flange 76 includes a first aperture 77A and a second aperture 77B both at an inner diameter of the radial flange 76. The apertures 77A, 77B serve as a fluid inlet and as a fluid outlet, respectively. The pressurized fluid level in the first fluid chamber 84 is controlled by a controller C that receives operating parameters I such as driving torque 13 on the input shaft 14, torque 99 on the output shaft 18, driver torque demand, etc. The controller C includes a processor 85 that is configured to execute stored instructions that, based on the input I, controls a pump P that provides fluid from a fluid source S to control the volume of fluid in the fluid chamber 84, and hence the pressure on the face 88 of the vane 82 exposed to the fluid. The rotational force applied by the rotary piston 54 on the axially-movable pulley 26B is equal to fluid pressure times the surface area of the face 88 of the movable vane 82 exposed to the pressurized fluid. The rotational force urges the axially-movable pulley sheave 26B (and the axially-fixed pulley sheave 26A splined thereto) to rotate slightly (i.e., less than a full rotation) relative to the output shaft 18 and the fixed vane 78. This rotation provides relative motion between the ramp surface 58 and the wedge surface 56, resulting in a wedge force $F_{wedge}$ 92 on the ramp surface 58 and a clamping force $F_{clamp}$ 94 of the endless rotatable device 28 on the pulley 26, both indicated in FIG. 4.

The mechanical advantage of the wedge component 30 is the friction force $F_{friction}$ 100 between the endless rotatable device 28 and the frustoconical surface 51B of the output pulley 26 and has the same direction with the piston force $F_{piston}$ 90, thus the friction force $F_{friction}$ 100 helps the piston force $F_{piston}$ 90 to reduce the required actuation force. More specifically, as best shown in FIG. 4, the piston force $F_{piston}$ 90 (i.e., the rotary force of the rotary piston 54) results in a wedge force $F_{wedge}$ 92 due to the angle α of the ramp surface 58 and of the wedge surface 56 relative to a line 94 that is perpendicular to the output axis 20. The wedge force $F_{wedge}$ 92 is normal to the ramp surface 58 and has an axial component that results in axial movement of the movable sheave 26B and a clamping force $F_{clamp}$ 94 of the endless rotatable device 28 against the output pulley 26. The thrust bearing 32 positioned between the axially-fixed sheave 26A and a fixed flange 98 of the output shaft 18 reacts the axial force. The torque load 99 on the output shaft 18 is indicated as being opposite to the direction of rotation ω of the output shaft 18. A friction force $F_{friction}$ 100 between the endless rotatable device 28 and the frustoconical surface 51B of the output pulley 26 is the product of the clamping force $F_{clamp}$ and the coefficient of friction μ between the endless rotatable device 28 and the frustoconical surface 51B of the axially-movable output sheave 26B. The endless rotatable device 28 also creates a friction force along the surface 51A of the axially-fixed sheave 26A of the output pulley 26. A force balance equation of forces acting on the axially-movable sheave 26B is simplified as follows:

$$F_{piston}/F_{clamp} = \tan \alpha - \mu; \quad \text{(EQUATION 1)}$$

where $F_{piston}$ is the rotational force 90 of the pressurized fluid on the rotary component 72 of the rotary piston 54, $F_{clamp}$ is the resulting clamping force 100 of the rotary component 72 against the axially-movable sheave 26B; α is the angle of the wedge surface 56 (and of the ramp surface 58) relative to the line 93 perpendicular to the output axis 20; and μ is the coefficient of friction between the endless rotatable device 28 and the frustoconical surface 51B of the axially-movable sheave 26B. The coefficient of friction μ is dependent on the materials of these components.

As is apparent from the above EQUATION 1, the $F_{piston}$ to maintain the clamping force $F_{clamp}$ can be very small or reduced to zero if the wedge angle is selected so that tan α is very close to or equal to the coefficient of friction μ. Stated differently, the fluid pressure in the fluid chamber 84 can be very small or reduced to zero while maintaining the axial position of the axially-movable sheave 26B after the axial position of the axially-movable sheave 26B is adjusted by the rotary piston 54 to establish a controlled position of the output pulley with a desired speed ratio between the input shaft 14 and the output shaft 18. This reduces pumping energy requirements in comparison to an actuator mechanism that requires a very high actuating fluid pressure to be maintained throughout the operation of the CVT 10 at the established speed ratio. Accordingly, the wedge surface 56, the output pulley 26, and the endless rotatable device 28 are configured so that a fluid pressure of zero in the first fluid chamber maintains a controlled position of the output pulley.

The torque load 99 on the output shaft 18, such as due to the vehicle load will be opposite to the direction of rotation of the rotary component 72 of the rotary piston 54 (i.e., opposite to the direction of relative rotation of the axially-movable pulley sheave 26B). The torque load 99 is thus in the same rotational direction as a rotary component of the wedge force $F_{wedge}$ 92 and thus reinforces the wedge force $F_{wedge}$ 92 against the axially-movable pulley sheave 26B. In a situation where the torque load 99 is in the same direction as the piston force $F_{piston}$ 90, such as when vehicle wheels operatively connected to the output shaft 18 encounter a pothole, or during engine braking, the torque load on the output shaft 18 could be in the same direction as the piston force $F_{piston}$ 90, in which case the fluid pressure can be controllably increased to maintain a wedge force $F_{wedge}$ 92 on the axially-movable pulley sheave 26B.

Referring again to FIG. 1, the axially-movable sheave 24B of the input pulley 24 also has a ramp surface 58 that inclines in an axial direction along the second axis (i.e., the input axis 16) toward the endless rotatable device 28. The endless rotatable device 28 is frictionally engaged with the input pulley 24. The input wedge component 30 has a wedge surface 56 interfacing with the ramp surface 58 of the pulley shaft 24C the axially-movable sheave 24B. The wedge surface 56 and the ramp surface 58 of the input actuator mechanism 52A are configured and function as described with respect to the wedge surface 56 and the ramp surface 58 of the output actuator mechanism 52B. An input rotary piston (not shown) identical to the rotary piston 54 of the output actuator mechanism 52B is operatively connected to the input wedge component 30 and to the axially-movable sheave 24B and defines another fluid chamber pressurizable to apply a rotational force that provides relative motion between the ramp surface 58 of the axially-movable sheave 24B and the wedge surface 56 of the input wedge component 30 resulting in a wedge force on the ramp surface 58 of the input pulley shaft 24C and a clamping force of the endless rotatable device 28 on the input pulley 24 as described with respect to the output actuator mechanism 52B and the output pulley 26.

The input actuator mechanism 52A and the output actuator mechanism 52B can be controlled by the controller C to move the axially-movable sheaves 24B, 26B in response to operating conditions I to vary the speed ratio of the input pulley 24 to the output pulley 26. The controller C will control the fluid pressure to the fluid chamber of the input actuator mechanism 52A so that the net axial force resulting from a clamping force of the endless rotatable device 28 on the pulley 24 and the axial component of the wedge force on the axially-movable pulley sheave 24B causes the axially-movable pulley sheave 24B to move closer to the axially-fixed pulley sheave 24A if the axially-movable pulley sheave 26B is controlled to move further from the pulley sheave 26A, and further from the pulley sheave 24A if the pulley sheave 26B is controlled to move closer to the pulley sheave 26A.

Figure 5:
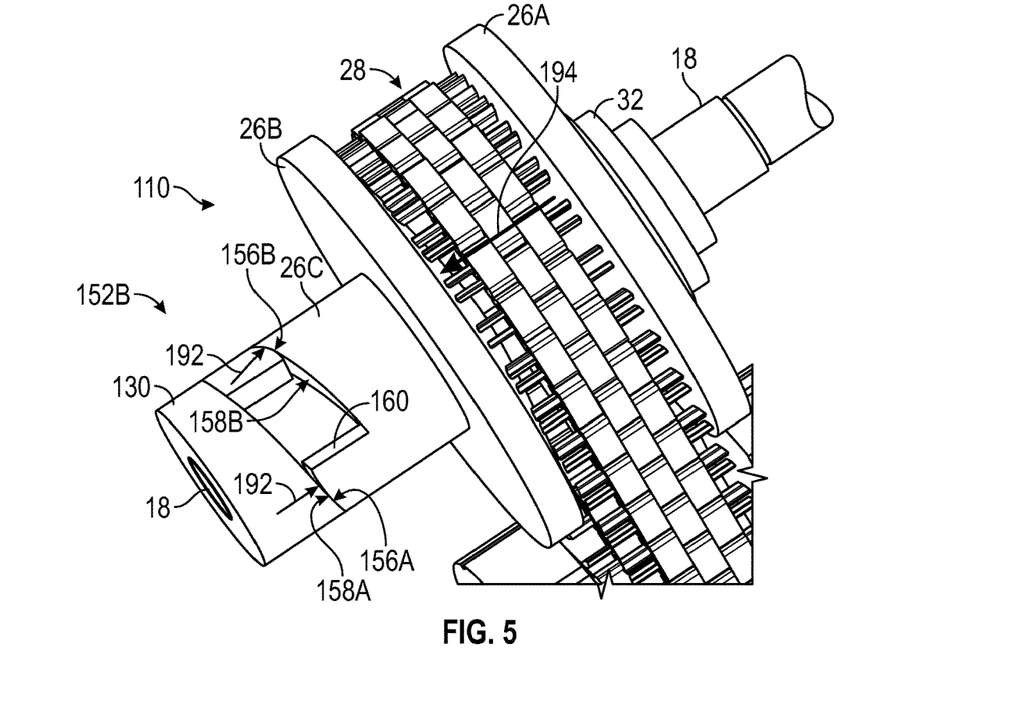
FIG. 5 is a schematic perspective illustration in partial fragmentary view of a second embodiment of a CVT with a dual wedge actuator in accordance with an alternative aspect of the present teachings.

FIG. 5 shows a portion of an alternative embodiment of a CVT 110 alike in all aspects to the CVT 10 except that an output actuator mechanism 152B (and an identical input actuator mechanism (not shown)) is modified to include a dual-wedge surface wedge component, a dual-ramp surface pulley shaft, and a two-chamber rotary piston 254 controlled by the controller C as in FIG. 1. More specifically, as shown with respect to output actuator mechanism 152B, the pulley shaft 26C has two helical ramp surfaces 158A and 158B. Unlike ramp surface 58 which winds one complete turn about the pulley shaft 26C, each of the helical ramp surfaces 158A, 158B winds only one-half way (i.e., 180 degrees) about the shaft 26C, with the ramp surface 158A starting at a rotational position at which ramp surface 158B ends and vice versa. In other words, the ramp surfaces 158A, 158B start at the same axial position 180 degrees apart from one another. For that reason, there are two steps 160 positioned 180 degrees apart from one another (only one step 160 is visible in FIG. 5).

The output actuator mechanism 152B also includes a wedge component 130 fixed to the output shaft 18 such that the wedge component 130 rotates in unison with the output shaft 18 and cannot rotate relative to the output shaft 18. The wedge component 130 is alike in all aspects to the wedge component 30, except it includes two helical wedge surfaces 156A, 156B that interface with ramp surfaces 158A and 158B, respectively. The wedge surfaces 156A, 156B of the wedge component 130 is a double helix, while the wedge surface 56 of the wedge component 30 is a single helix. Each wedge surface 156A and 156B and each ramp surface 158A, 158B must have twice the pitch as the wedge surface 56 and the ramp surface 58 in FIG. 1 in order for the axial range of movement of the pulley sheave 26B to be the same (i.e., to have the same length of the step 60 in the axial direction).

In order for a wedge force to provide a force component in the axial direction of equal magnitude to the axial force provide by the wedge force 92 of the embodiment of FIG. 1, the wedge force 192 acting on the ramp surfaces 158A, 158B must be twice that of the wedge force 92. This requires twice the actuation force. Accordingly, a rotary piston included in the output actuator mechanism 152B must have twice the rotary force as that of rotary piston 54. This can be accomplished by using a rotary piston like rotary piston 54 but having a second stationary vane 78 and a second rotary vane 82 that are 180 degrees apart from those shown in FIG. 1 to create two separate hydraulic chambers 84A, 84B as shown with respect to the embodiment of rotary piston 254 of FIG. 6. By including a second vane 82, there is twice as much total surface area that the fluid pressure acts on. A second pair of apertures 77A, 77B is provided in the radial flange 76 to enable fluid flow into and out of the second fluid chamber 84B. The second fluid chamber 84B thus increases the total area against which fluid pressure acts, thereby resulting in an additional rotational force, increasing the piston force, resulting in a wedge force 192 at each of the ramp surfaces so that the sum of the wedge forces 192 is twice the magnitude to the wedge force 92 of FIG. 4. Because of the increased pitch of a double helix wedge component, the angle α of the ramp surface 58 and of the wedge surface 56 relative to a line 94 that is perpendicular to the output axis 20 is twice as large in the embodiments with dual chamber pistons. The axial component of the larger wedge force will thus be the same as in the embodiment with a single wedge chamber and a single wedge surface. The wedge forces 192 result in a clamping force 194.

Figure 6:
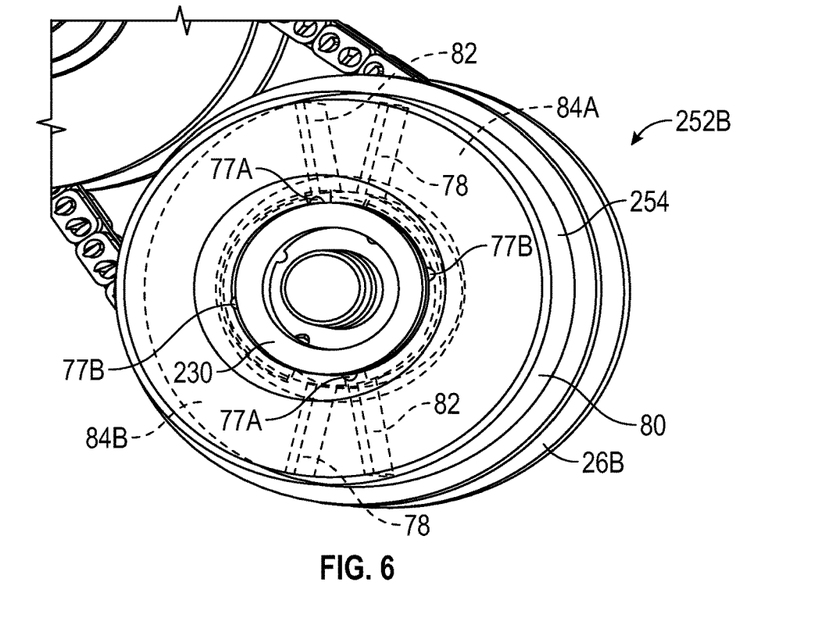
FIG. 6 is a schematic perspective illustration in fragmentary view of a two-chamber rotary piston of the CVT of FIG. 5.

FIG. 6 shows the two-chamber rotary piston 254 as described, but included in a dual-wedge output actuation mechanism 252B that includes what may be referred to as a roller-type dual wedge mechanism. The two-chamber rotary piston 254 of FIG. 6 could instead be used in the output actuation mechanism 152B and with the wedge component 130 of FIG. 5. The dual-wedge embodiment of FIGS. 6 and 7 utilizes a wedge component 230 that has two helical grooves 259A, 259B at an inner cylindrical surface of a wedge component 230. The side surface 256A, 256B of each groove 259A, 259B nearest to the endless rotatable device 28 serves as a wedge surface 256A, 256B such that there are two wedge surfaces.

Figure 7:
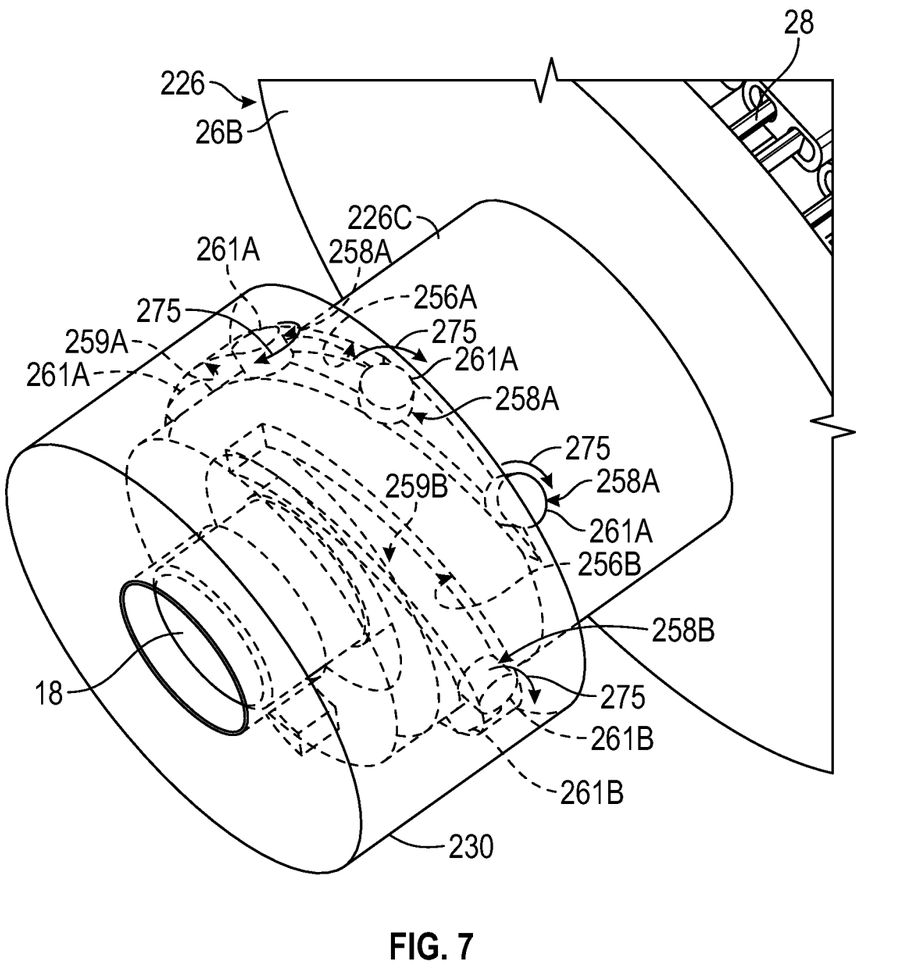
FIG. 7 is a schematic perspective illustration in fragmentary view of a third embodiment of a CVT with a dual wedge actuator in accordance with an alternative aspect of the present teachings.

FIG. 7 shows the output pulley 226 includes the axially-movable sheave 26B but with a pulley shaft 226C that extends along the axis 20 within the wedge component 230. The two-chamber rotary piston 254 is removed in FIG. 7 so that the wedge component 230 is exposed. A first helical array of rolling elements 261A and a second helical array of rolling elements 261B are secured to the pulley shaft 226C. The rolling elements 261A and 261B are spaced about the outer surface of the pulley shaft 226C such that they incline in the same axial direction as the wedge surfaces 256A, 256B. The rolling elements 261A, 261B are spaced so that rolling elements 261A are captured in the first groove 259A, and additional rolling elements 261B are captured in the second groove 259B. Only some of the rolling elements 261A, 261B are visible in FIG. 7. The rolling elements 261A, 261B are fixed in position on the pulley shaft 226C, but each spins along its center axis (as indicated by arrows 275 in FIG. 7) when the rolling elements 261A, 261B contact the wedge surfaces 256A, 256B as the axially-movable sheave 26B rotates relative to the output shaft 18 under the rotary force of the rotary piston 254. The rotary piston 254 surrounds the wedge component 230 and the pulley shaft 226C in the cylindrical space between the wedge component 230 and the cover 80 as shown in FIG. 6. The side surfaces 258A of the rolling elements 261A that contact the first wedge surface 256A in the first wedge groove 259A serve as the first ramp surface 258A. The side surfaces 258B of the rolling elements 261B that contact the second wedge surface 256B in the second wedge groove 259B serve as the second ramp surface 258B.

Figure 8:
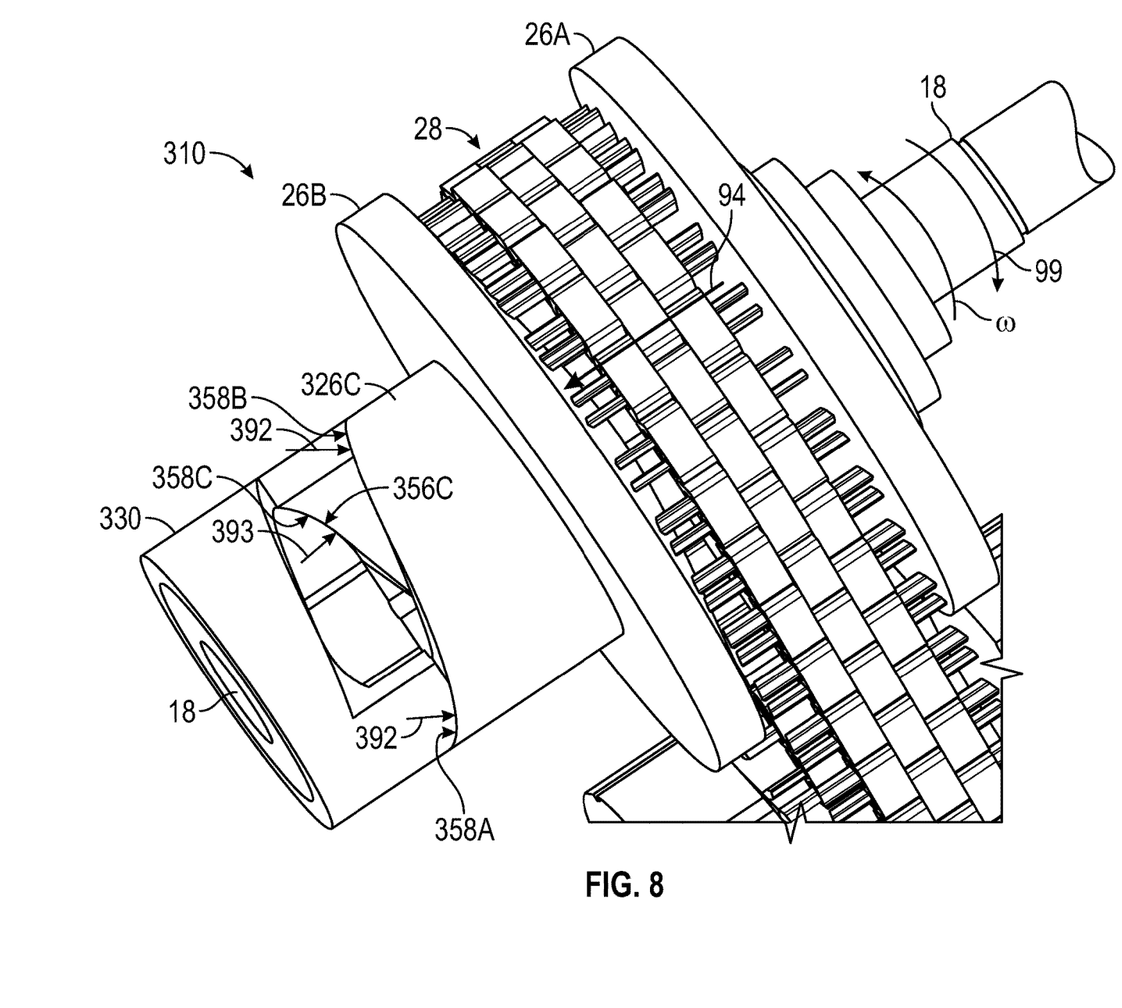
FIG. 8 is a schematic perspective illustration in fragmentary view of a fourth embodiment of a CVT in accordance with an alternative aspect of the present teachings.
Figure 9:
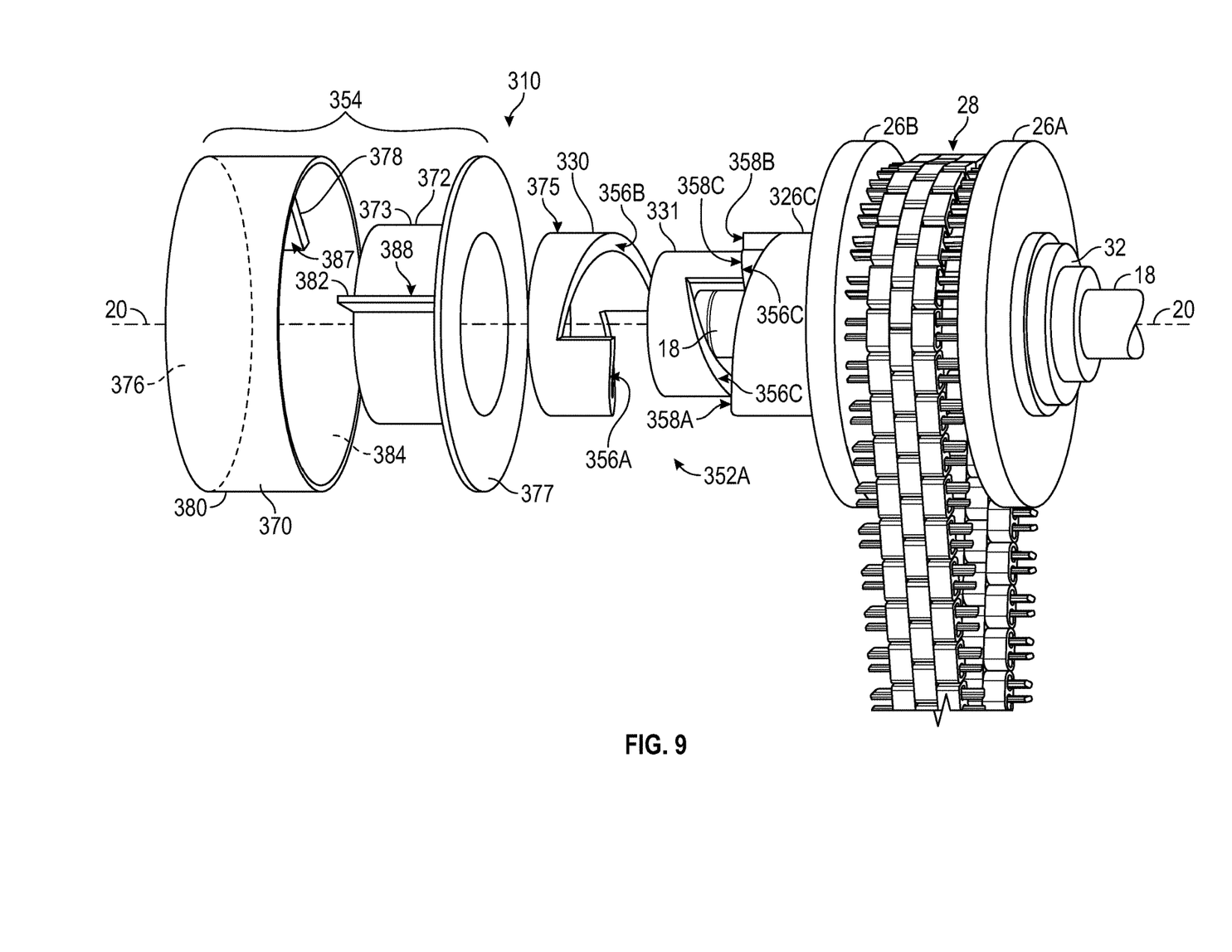
FIG. 9 is a schematic illustration in exploded perspective view of the CVT of FIG. 8.

FIGS. 8 and 9 show another embodiment of a CVT 310 having many of the same components as described with respect to the CVT 10 of FIG. 1. In this embodiment, an actuator mechanism 352A has a wedge component 330 that surrounds the pulley shaft 18 and is rotatable relative to the pulley shaft 18 in response to controlled fluid pressure in a rotary piston 354. The rotary piston 354 is controlled by the controller C in the same manner as described with respect to FIG. 1. In contrast to the other embodiments described herein, the wedge component 330 to which the stationary component 370 of the rotary piston 354 is mounted is not fixed to the shaft 18 and can rotate relative to the shaft 18. More specifically, the rotary component 372 of the rotary piston 354 is fixed to the wedge component 330 so that the wedge component 330 rotates with the rotary component 372 when fluid pressure in a fluid chamber 384 of the rotary piston 354 is controlled by the controller C to cause relative rotation of the rotary component 372 and thus phasing of the wedge component 330 relative to the pulley shaft 326C.

Similar to the actuator mechanism 152B, the wedge component 330 has two helical wedge surfaces 356A, 356B that interface with two helical ramp surfaces 358A and 358B of the pulley shaft 326C, respectively. The rotary component 372 of the rotary piston 354 has a cylindrical shaft portion 373 that surrounds and is fixed to an outer surface 375 of the rotary component 372. A radial flange 377 extends from the shaft portion 373, and a vane 382 extends radially outward from the shaft portion 373. The stationary component 370 of the rotary piston 354 is fixed to the shaft 18. More specifically, a radial flange 376 of the stationary component 370 has a central opening at which it is fixedly mounted to an additional wedge component 331. The additional wedge component 331 is in turn fixed to the output shaft 18 such that the stationary component 370 and the additional wedge component 331 rotate with but not relative to the output shaft 18.

The stationary component 370 has a stationary vane 378 that is fixed to the cover 380 of the stationary component 370 and extends radially inward. The fluid chamber 384 is defined between the rotary component 372 and the stationary component 370 from the surface 387 of the stationary vane 378 to the surface 388 of the movable vane 382. The fluid chamber 384 extends from the inner surface of the cover 380 to the outer surface of the cylindrical portion 373 and from the radial flange 376 to the radial flange 377. When assembled, the rotary piston 354 fits in a cylindrical space around the additional wedge component 331 adjacent the pulley sheave 26B. Fluid pressure in the rotary piston 354 generates wedge forces 392 at the ramp surfaces 358A, 358B as described with respect to the dual wedge surfaces 156A, 156B and wedge surface 56, resulting in a controllable clamping force 94 of the endless rotatable device 28 on the output pulley 26. The input pulley 24 has an identical actuation mechanism operatively connected to the movable sheave 24B of the input pulley 24.

The CVT 310 of FIGS. 8 and 9 includes an additional wedge component 331 that is fixed to the output shaft 18 shaft. The additional wedge component 331 also has dual wedge surfaces. Only one wedge surface 356C is visible in FIG. 9. The dual wedge surfaces of the additional wedge component 331 form another dual helix, each wedge surface spiraling one half turn (180 degrees) around the perimeter of the additional wedge component 331 similar to the wedge surfaces 156A and 156B of the embodiment of FIGS. 5-6. The additional wedge component 331 is surrounded radially-outward by the actuation wedge component 330. The pulley shaft 326C has a second ramp surface 358C and another second ramp surface not visible in FIG. 9 that together form a dual helix. The second ramp surfaces of the pulley shaft 326C are radially-inward of the ramp surfaces 358A, 358B. The second ramp surfaces interface with wedge surfaces 356C (and the other wedge surface not shown) of the additional wedge component 331. The second ramp surfaces of the pulley shaft 326C incline in an opposite direction along the axis 20 than the ramp surfaces 358A, 358B that interface with the wedge surfaces 356A, 356B of the actuation wedge component 330. For this reason, the actuation mechanism 352A is referred to as a cross-wedge.

The actuation wedge component 330 can rotate relative to the additional wedge component 331. A bearing may be placed between the inner surface of the actuation wedge component 330 and the additional wedge component 331 to aid in this relative rotation. A torque load 99 on the output shaft 18 is in an opposite direction as the direction of rotation of the output pulley 26 under the force of the endless rotatable device 28. Accordingly, a wedge force due to this torque is indicated as wedge force 393 in FIG. 8. This wedge force 393 has a component acting in the same axial direction as the wedge forces 392 of the actuation wedge component 330 and thus results in an additional clamping force of the endless rotatable device 28 against the movable sheave. The wedge force 393 is generated due to the torque 99 automatically (i.e., not under the control of the controller C) and the additional wedge 331 is referred to as a self-reinforcement wedge.

In each embodiment disclosed herein, a clamping force on the movable sheave 26B is controlled and pumping losses are minimized by utilizing the mechanical advantage of both wedges 30, 130, 230, 330.

While the best modes for carrying out the many aspects of the present teachings have been described in detail, those familiar with the art to which these teachings relate will recognize various alternative aspects for practicing the present teachings that are within the scope of the appended claims.

The invention claimed is:
1. A continuously variable transmission comprising:
a shaft rotatable about an axis;
a variator assembly including:
  a pulley supported on the shaft and having a ramp surface;
  an endless rotatable device frictionally engaged with the pulley; wherein the ramp surface inclines in an axial direction along the axis toward the endless rotatable device;
an actuator mechanism comprising:
  a wedge component that has a wedge surface interfacing with the ramp surface;
  a rotary piston operatively connected to the wedge component and defining a first fluid chamber pressurizable to apply a rotational force resulting in a wedge force on the ramp surface and a clamping force of the endless rotatable device on the pulley;
  wherein the rotary piston includes a stationary component and a rotary component that cooperate with each other to enclose a volume, and wherein the first fluid chamber is disposed in the volume; and
  wherein the rotary piston includes a stationary vane extending outwardly into the volume and a movable vane extending outwardly into the volume, and wherein the stationary vane and the movable vane define respective ends of the first fluid chamber.
2. The continuously variable transmission of claim 1, wherein:
the pulley has an axially-fixed sheave and an axially-movable sheave;
the axially-movable sheave is splined to the axially-fixed sheave; and the axially-movable sheave and the axially-fixed sheave rotate in unison relative to the shaft under application of the rotational force of the rotary piston on the pulley.

3. The continuously variable transmission of claim 2, further comprising:
a thrust bearing positioned between the axially-fixed sheave and the shaft.

4. The continuously variable transmission of claim 1, wherein the shaft is an output shaft, the axis is a first axis, and the pulley is an output pulley; the wedge component is an output wedge component; the actuator mechanism is an output actuator mechanism; and further comprising:
an input shaft rotatable about a second axis;
wherein the variator assembly further includes:
an input pulley rotatably supported by the input shaft and having a ramp surface that inclines in an opposite axial direction along the second axis toward the endless rotatable device; wherein the endless rotatable device is frictionally engaged with the input pulley;
an input actuator mechanism comprising:
an input wedge component that has a wedge surface interfacing with the ramp surface of the input pulley; and
an input rotary piston operatively connected to the input wedge component and defining another fluid chamber pressurizable to apply a rotational force resulting in a wedge force on the ramp surface of the input pulley and a clamping force of the endless rotatable device on the input pulley.

5. The continuously variable transmission of claim 1, wherein:
the wedge surface is a first wedge surface and the ramp surface is a first ramp surface;
the pulley has a second ramp surface and the wedge component has a second wedge surface; and
the rotary piston defines a second fluid chamber pressurizable to apply an additional rotational force that moves the second ramp surface along the second wedge surface.

6. The continuously variable transmission of claim 5, wherein the first and the second wedge surface are arranged in a double helix.

7. The continuously variable transmission of claim 1, wherein:
the wedge component has a groove at the wedge surface; and
the pulley has:
a pulley shaft extending along the axis; and
rolling elements secured to the pulley shaft and captured in the groove; wherein the rolling elements define the ramp surface.

8. The continuously variable transmission of claim 7, wherein:
the groove is a first groove;
the wedge surface is a first wedge surface;
the wedge component has a second groove with a second wedge surface;
the pulley has additional rolling elements secured to the pulley shaft, and captured in the second groove; and
the additional rolling elements define a second ramp surface.

9. The continuously variable transmission of claim 1, wherein the wedge component is fixed to the shaft to rotate at a common speed in unison with the shaft.

10. The continuously variable transmission of claim 1, wherein:

the wedge component is rotatable relative to the shaft;
the pulley has a second ramp surface inclining in an opposite axial direction along the axis; and
the actuator mechanism further comprising:
an additional wedge component concentric with the axis; and
wherein the additional wedge component is fixed to the shaft to rotate in unison with the shaft about the axis, and has an additional wedge surface interfacing with the second ramp surface of the pulley to provide an additional wedge force on the second ramp surface and an additional clamping force of the endless rotatable device on the pulley.

11. The continuously variable transmission of claim 1, wherein:
the wedge component has two wedge surfaces arranged in a double helix;
the pulley includes a pulley shaft, and the pulley shaft has two ramp surfaces arranged in a double helix; and
the second ramp surface is radially-inward of the two ramp surfaces of the pulley shaft.

12. The continuously variable transmission of claim 1, further comprising:
a controller operatively connected to the rotary piston and operable to control fluid pressure within the first fluid chamber.

13. The continuously variable transmission of claim 1, wherein the pulley is an output pulley, and wherein the wedge surface, the output pulley, and the endless rotatable device are configured so that a fluid pressure of zero in the first fluid chamber maintains a controlled position of the output pulley.

14. A continuously variable transmission comprising:
an input shaft rotatable about a first axis;
an output shaft rotatable about a second axis;
a variator assembly including:
an input pulley supported on the input shaft and having a ramp surface;
an output pulley supported on the output shaft and having a ramp surface;
an endless rotatable device frictionally engaged with the pulley; wherein the ramp surface of the input pulley inclines in an axial direction along the axis toward the endless rotatable device, and the ramp surface of the output pulley inclines in an opposite axial direction toward the endless rotatable device;
an input actuator mechanism comprising:
an input wedge component that has a wedge surface interfacing with the ramp surface of the input pulley; and
a rotary piston operatively connected to the input wedge component and defining a first fluid chamber pressurizable to apply a rotational force resulting in a wedge force on the ramp surface of the input pulley and a clamping force of the endless rotatable device on the input pulley;
an output actuator mechanism comprising:
an output wedge component that has a wedge surface interfacing with the ramp surface of the output pulley; and
a rotary piston operatively connected to the output wedge component and defining a first fluid chamber pressurizable to apply a rotational force resulting in a wedge force on the ramp surface of the output pulley and a clamping force of the endless rotatable device on the output pulley; and a controller operatively connected to the rotary piston of the input actuator mechanism and to the rotary piston of the output actuator mechanism;

wherein the controller is operable to control fluid pressure in the first fluid chamber of the rotary piston of the input actuator mechanism and in the first fluid chamber of the rotary piston of the output actuator mechanism to vary a speed ratio of the input shaft to the output shaft;

wherein the rotary piston of one of the input actuator mechanism and the output actuator mechanism includes a vane that extends outwardly away from the respective one of the input shaft and the output shaft, and the vane defines one end of the first fluid chamber of the respective rotary piston of the one of the input actuator mechanism and the output actuator mechanism.

15. The continuously variable transmission of claim 14, wherein:
   each of the input pulley and the output pulley has an axially-fixed sheave and an axially-movable sheave;
   the axially-movable sheave is splined to the axially-fixed sheave; and
   the axially-movable sheave and the axially-fixed sheave rotate in unison relative to the respective input shaft and output shaft under application of the rotational force.

16. The continuously variable transmission of claim 14, wherein:
   the wedge surface of the output wedge component is a first wedge surface and the ramp surface of the output pulley is a first ramp surface;
   the output pulley has a second ramp surface and the output wedge component has a second wedge surface; and
   the rotary piston of the output actuator mechanism defines a second fluid chamber pressurizable to apply an additional rotational force that moves the second ramp surface of the output pulley along the second wedge surface of the output wedge component.

17. The continuously variable transmission of claim 14, wherein:
   the wedge component of the output wedge component has a groove at the wedge surface; and
   the output pulley has:
      a pulley shaft extending along the axis; and
      rolling elements secured to the pulley shaft and captured in the groove; wherein the rolling elements define the ramp surface of the output pulley.

18. The continuously variable transmission of claim 14, wherein:
   the output wedge component is rotatable relative to the output shaft;
   the output pulley has a second ramp surface inclining in an opposite axial direction along the second axis; and
   the output actuator mechanism further comprising:
      an additional wedge component concentric with the second axis;
      wherein the additional wedge component is fixed to the output shaft to rotate in unison with the output shaft about the second axis, and has an additional wedge surface interfacing with the second ramp surface of the output pulley to provide an additional wedge force on the second ramp surface and an additional clamping force of the endless rotatable device on the output pulley.

19. The continuously variable transmission of claim 14, wherein the wedge surface, the output pulley, and the endless rotatable device are configured so that a fluid pressure of zero in the first fluid chamber maintains a controlled position of the output pulley.

20. A continuously variable transmission comprising:
   a shaft rotatable about an axis;
   a variator assembly including:
      a pulley supported on the shaft, and the pulley includes an axially-fixed sheave and an axially-movable sheave;
      a pulley shaft fixed to the axially-movable sheave, and the pulley shaft surrounds the shaft, and wherein the pulley shaft includes a ramp surface;
      an endless rotatable device frictionally engaged with the pulley; wherein the ramp surface inclines in an axial direction along the axis toward the endless rotatable device;
   an actuator mechanism comprising:
      a wedge component that has a wedge surface interfacing with the ramp surface;
      a rotary piston operatively connected to the wedge component and defining a fluid chamber pressurizable to apply a rotational force resulting in a wedge force on the ramp surface and a clamping force of the endless rotatable device on the pulley; and
      wherein the rotary piston includes a vane extending outwardly away from the shaft, and the vane defines one end of the fluid chamber.

* * * * *

UNITED STATES PATENT AND TRADEMARK OFFICE
CERTIFICATE OF CORRECTION

PATENT NO. : 10,267,391 B2
APPLICATION NO. : 15/183948
DATED : April 23, 2019
INVENTOR(S) : Jian Yao et al.

Page 1 of 1

It is certified that error appears in the above-identified patent and that said Letters Patent is hereby corrected as shown below:

In the Claims

Column 12, Line 14, Claim 11, delete "claim 1," and insert -- claim 10, --

Signed and Sealed this
Tenth Day of December, 2019

Andrei Iancu
*Director of the United States Patent and Trademark Office*